United States Patent [19]
Underwood et al.

[11] 3,754,803
[45] Aug. 28, 1973

[54] EQUIPMENT TRANSPORTER AND STORAGE MODULE

[75] Inventors: Paul Underwood, Garden Grove; Douglas A. Miller, Playa del Rey, both of Calif.

[73] Assignee: Hughes Aircraft Company, Culver City, Calif.

[22] Filed: Sept. 30, 1971

[21] Appl. No.: 185,215

[52] U.S. Cl................... 312/31, 220/1.5, 217/55
[51] Int. Cl. ........................................... A24f 25/00
[58] Field of Search................ 220/1.5; 248/358 A, 248/358 AA; 217/52–55; 296/46 FR; 312/31

[56] References Cited
UNITED STATES PATENTS
3,061,134  10/1962  Fesmire et al. ...................... 220/1.5
3,271,089  9/1966  Krellen ............................ 220/1.5 X
3,499,694  3/1970  Coppel............................ 220/1.5 X FOREIGN PATENTS OR APPLICATIONS
157,280  12/1904  Germany ............................ 217/55

*Primary Examiner*—James C. Mitchell
*Attorney*—W. H. MacAllister and L. B. Sternfels

[57]  ABSTRACT

Capable of withstanding minimum forces of 300G and frequencies from zero to 50 Hz, the invention comprises a light weight, reusable, humidity controlled, controlled breathing, shipping and storage container with removable access doors at both ends. A carriage is suspended inside the exterior container by means of shock and vibration isolators. The carriage carries two or more shelves, the top shelf being hinged at both ends of the container at the doors to permit easy access to the lower shelf.

24 Claims, 14 Drawing Figures

Patented Aug. 28, 1973
3,754,803
4 Sheets-Sheet 1
Fig. 1.
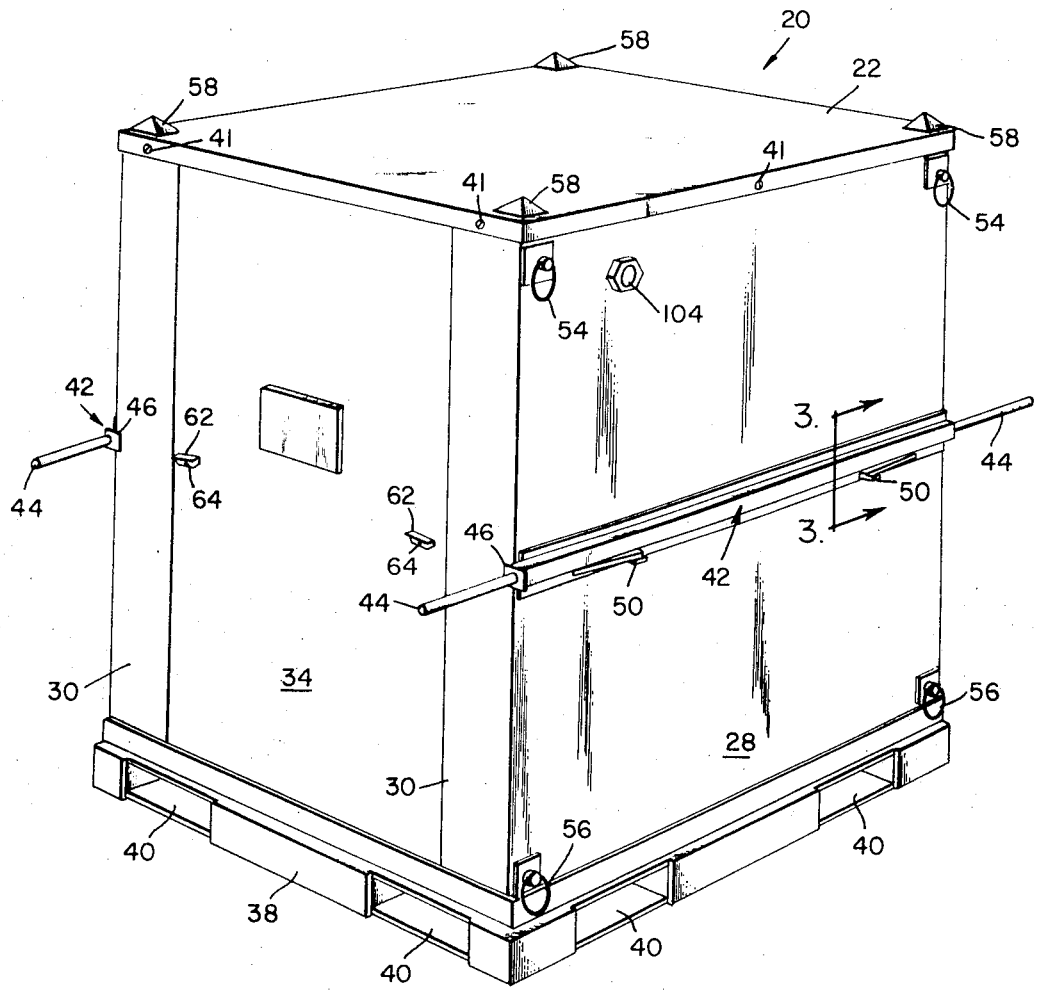
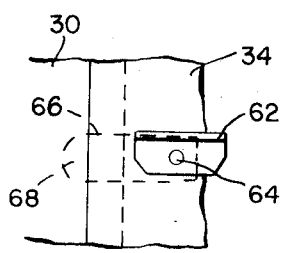
Fig. 4.
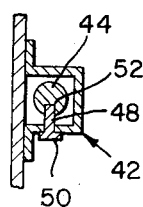
Fig. 3.

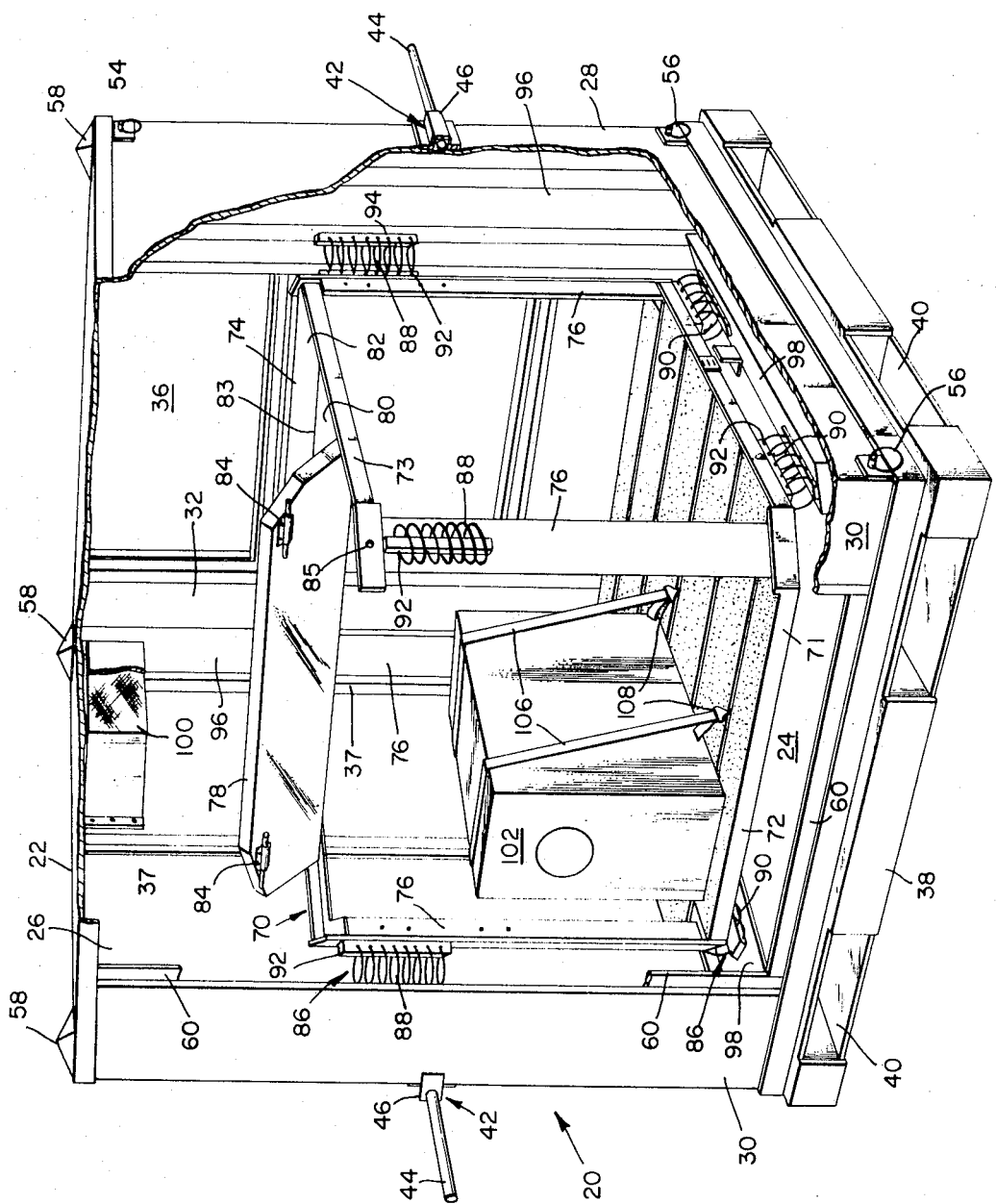

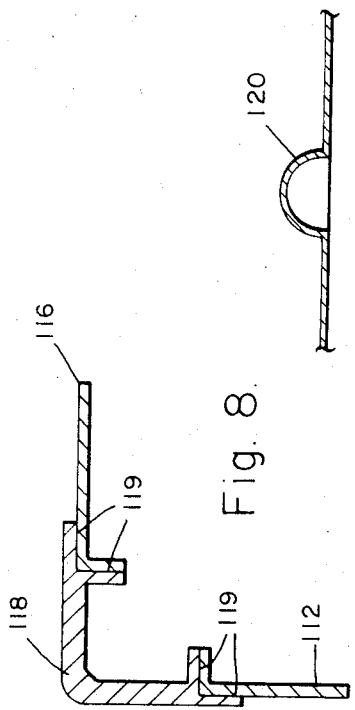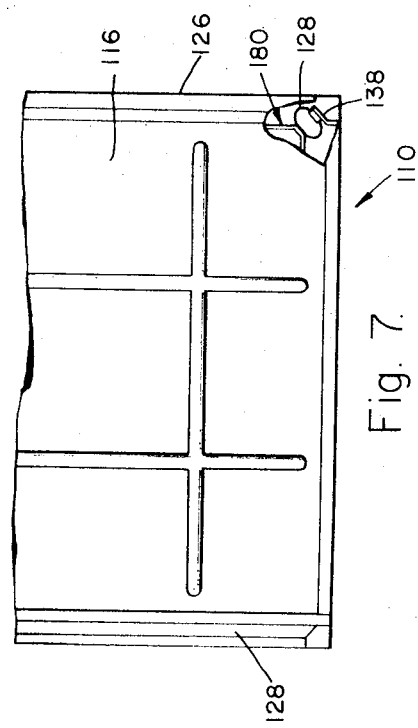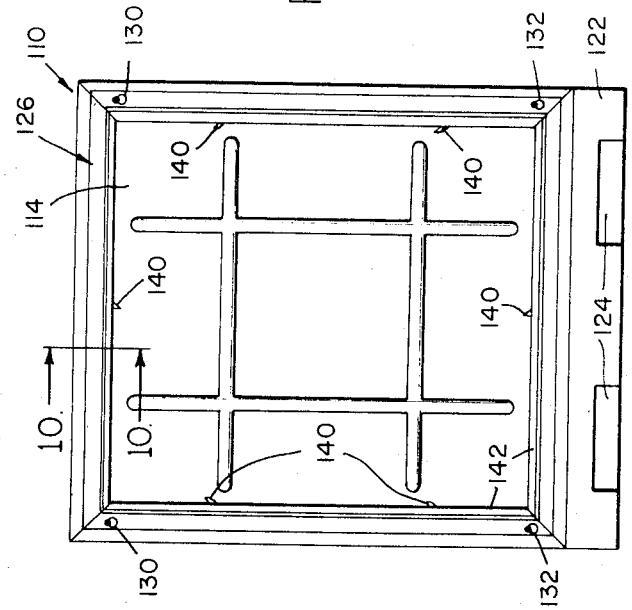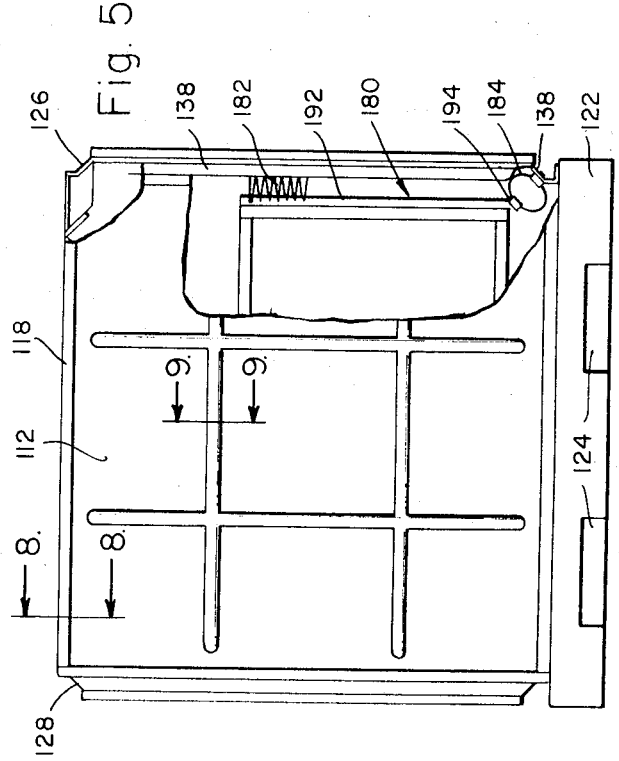

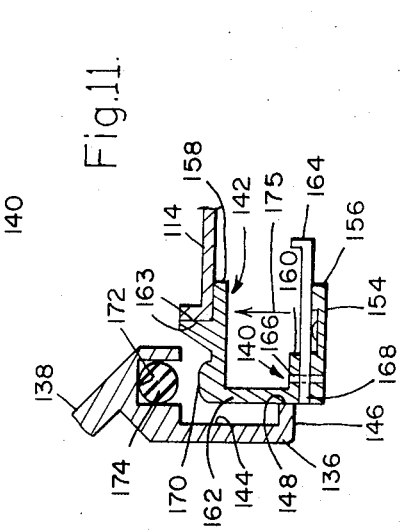
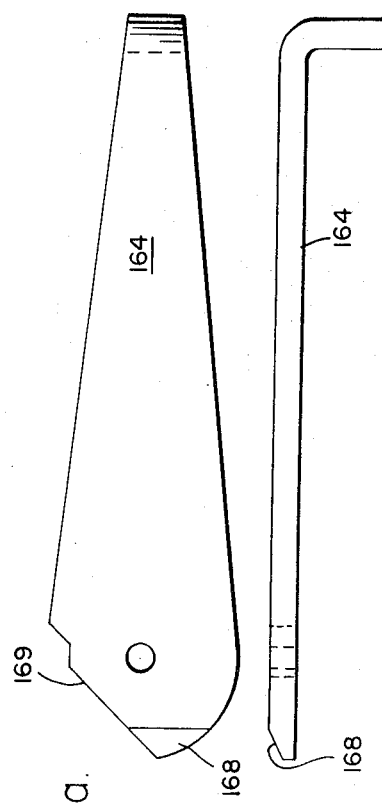
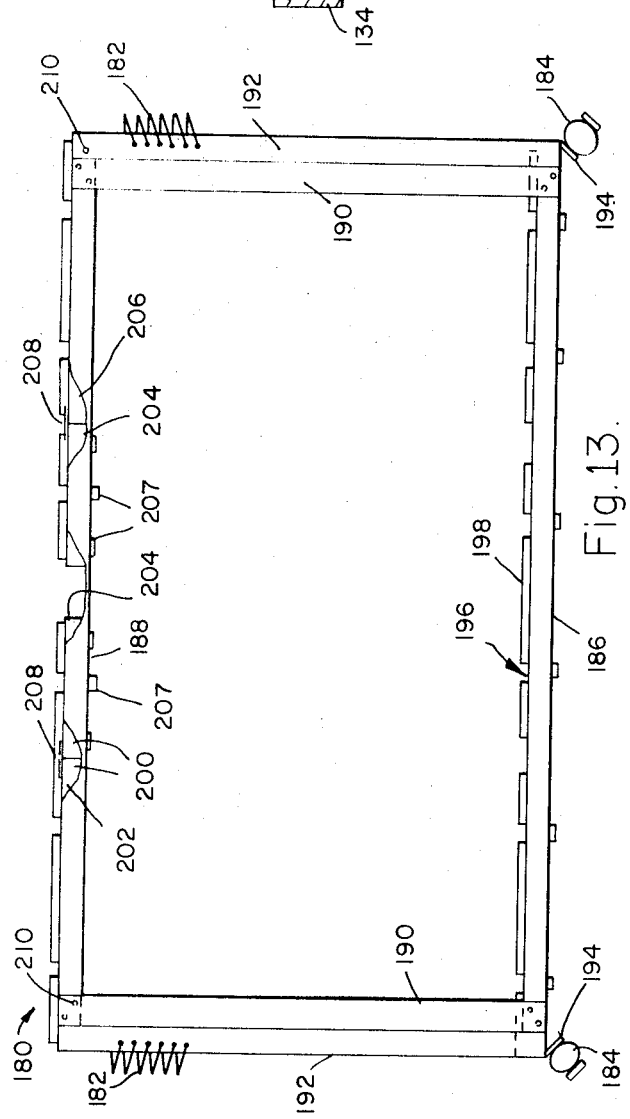

EQUIPMENT TRANSPORTER AND STORAGE MODULE

The present invention relates to a reusable equipment transporter and storage module and, more particularly, to such a module capable of temporarily storing and moving sensitive, high unit cost material for transport by aircraft, truck, forklift, ship, overhead lift, etc., or by hand.

Conventional methods of transporting equipment, including delicate instruments, have required the use of individual or collective packaging of such equipment in boxes or containers utilizing various impact cushioning materials, such as horsehair, polyurethane, and bubbles in plastic. Especially for delicate equipment, packaging specialists are required. Such packaging is generally expensive in order to prevent damage to the goods from shock and vibration or from such environmental contamination as as dust, dirt, sunshine, ozone, humidity and fungus. As stated above, conventional packaging techniques require individual handling of components which then may be secured to pallets or the like for transport. Upon receipt of such equipment, the packages are removed from the pallets and broken open thereby leading to greater packaging expense since, at least, the packages are no longer usable. Moreover, in such cases where equipment is packaged in the same container, improper installation or unobserved deterioration or damage to hold down equipment can cause great damage to the other contents; therefore, instruments have been historically packaged individually prior to installation in an over-pack. Some containers are specially designed to house specific equipment and are resuable. The problem with such specialized containers is that they are useful only for the equipment for which they were designed. If similar equipment were not to be reshipped, the containers would have to be returned empty or stored until needed. In either case, such specialty, reusable containers are costly to use and maintain.

The present invention overcomes these and other problems by providing an evironmentally protective, shock and impact hardened, reusable modular container which generally is generally usable for packaging several different and otherwise unprotected equipment. Briefly, the present invention comprises a sealable container of lighweight material with provision for controlled internal environment, such as protection from pressure variations, humidity, ozone, and fungus. Removable access doors are provided preferably at opposed ends of the container, although the module may be embodied as a container housing secured to a base. Suspended within the container by elastomeric-type shear mounts or cable-type isolators is a carriage with two or more layers of shelves. The top shelf layer is hinged at the ends adjacent the doors, if doors are used, to permit easy access to the lower shelf. The removable access doors at opposed ends are sealable and lockable to the container to provide an airtight enclosure. The interior of the container may be humidifed as desired, such as by a dessicant, pressurized or provided with breather apparatus, as desired, or provided with any desired atmosphere. The containers are of modular design and several may be stacked.

It is, therefore, an object of the present invention to provide a novel equipment transport and storage container.

Another object is the provision of a modular container.

Another object is the provision of a reusable container.

Another object is to provide such a container which is environmentally protectable from shock, vibration, dust, dirt, sunshine, ozone, humidity, fungus, etc.

Another object is a provision of stackable, fully loaded containers.

Another object is to provide such a container which avoids individual packaging of equipment.

Another object is to provide such a container having means for pressurization and pressure relief, dessication, drainage, and purging.

Another object is to provide such a container which is adaptable to conventional transportation handling techniques.

Other aims and objects, as well as a more complete understanding of the present invention, will appear from the following explanation of exemplary embodiments and the accompanying drawings thereof, in which:

FIG. 1 is a perspective view of a first embodiment of the present invention;

FIG. 2 is a perspective view, with the housing partially broken away showing interior portions of the embodiment of FIG. 1;

FIG. 3 is a sectional view of a manual carrying attachment taken along lines 3—3 of FIG. 1;

FIG. 4 is a fragmentary view of the door locking device for FIG. 1;

FIGS. 5–7 are respectively side, front, and top elevational views of a second embodiment of the present invention with portions thereof cut away to illustrate certain internal components thereof;

FIG. 8 is a sectional view of an edge attachment taken along lines 8–8 of FIG. 5;

FIG. 9 is a partial sectional view of a portion of the side panel taken along lines 9—9 of FIG. 5;

FIG. 10 is a sectional view of a portion of the door frame and door latching mechanism taken along lines 10—10 of FIG. 6 with the door in latching engagement;

FIG. 11 is a view of the latching mechanism of FIG. 10 prior to latching engagement;

FIGS. 12a and 12b are respectively side and edge views of the latching handle depicted in FIGS. 10 and 11; and FIG. 13 is a side elevational view of the carriage of the second embodiment.

Accordingly, with reference to FIGS. 1–4 and, in particular, FIGS. 1 and 2, an equipment transporter and storage module or container 20 comprises a top panel 22, a bottom panel 24, two side panels 26 and 28, front and back door frames 30 and 32, and front and rear doors 34 and 36. In FIG. 2, portions of top panel 22 and side panel 28 and all of front door 34 have been completely removed in order to provide an interior view of container 20. The panels may be reinforced as by pole-like supports 37 shown on side panel 26. The container is mounted on a conventionaly formed forklift base 38 having openings 40 therein for reception of forks of a forklift truck. All materials are made of a light weight material, such as aluminum, and may be secured together in any convenient means such as bolts 41 or bonding. Securement is such that the interior of modular container 20 is airtight.

As an alternate means for temporary lifting of container 20, a pair of manual lifts 42 are secured to side panels 26 and 28. Each manual lift includes a pair of slideable rods 44, as also shown in FIG. 3, which are extendable from ends 46 of the lift. Depending upon whether they are in use or not in use, rods 44 are lockable in either their retracted or extended positions by a spring loaded detent 48 manipulable by a handle 50, which is moveable downwardly towards base 38. Detent 48 fits within one of two notches 52 in each rod. The notches are so placed along rods 44 so as to lock the rods in their retracted positions or in their extended positions. Downward movement of handle 50 withdraws detent 48 from notch 52 to release the rod for extension or retraction.

Also secured to side panels 26 and 28 are lifting rings 54 and tie-down rings 56 which are screwed or bolted into or otherwise attached or bonded to their respective panels. Therefore, container 20 may be lifted by a crane or like means by use of rings 54 or tied down to a transporting vehicle by means of its rings 56.

For stacking purposes, a plurality of male protuberances 58 may be secured to top panel 22 for reception in mating female means in base 38. However, they may be omitted when desired, for example, if stacking is staggered.

Doors 34 and 36 are received within their respective frames 30 and 32 and abut against a door sill 60. Sealing means, such as O-rings or elastomeric tapes, placed between the doors and the sills, provide an airtight seal when the door is secured to the container. For this purpose, two or more door latches 62, see also FIG. 4, are pivotally secured on the door by means of a pivot 64 on which a tongue 66 is journaled. Tongue 66 is turnable to engage tongue end 68 with the interior of frame 30 in order to lock and seal the door to the frame. It is to be understood, of course, that other sealing means and locking means may be used, the above specific means being set forth solely for purposes of illustration and not for limitation.

In the interior of container 20 is a carriage 70 comprising shelf frames 71 and 73 supporting a bottom shelf layer 72 and a top shelf layer 74. The frames are secured together by four uprights or risers 76. If desired, other layers of shelves may be placed intermediate the top and bottom layers. Top layer 74 comprises three sections or shelves 78, 80 and 82. Center section 80 is secured to shelf frame or shelves 73 while sections 78 and 82 are hinged at 83 to center shelf section 80 in order to permit access to loading and unloading of bottom shelf layer 72. As shown in FIG. 2, shelf section 78 is raised. Secured to each of the movable shelf sections is a springed latch mechanism 84 which is designed to engage openings 85 in frame 73 when sections 78 and 82 are received within this frame. The shelves of top and bottom layers 72 and 74 may take any form, such as that shown in U.S. Pat. NO. 3,478,995.

Carriage 70 is shock mounted and isolated by a plurality of isolators generally designated by indicium 86. Four isolators 88 are mounted in vertical position while four other isolators 90 are mounted in a horizontal position. All isolators are secured by means of blocks 92 to uprights 76 of carriage 70 and to blocks 94 on risers or standards 96 and supports 98. The isolators herein described preferably comprise coils of stranded wire cable in which each coil interconnects at adjacent points to blocks 92 and 94. Such coils may comprise those disclosed in any of U.S. Pat. Nos. 3,204,911 through 3,204,913. Such helical shock mounts are also described in Brochures SM6169 and 26g-5M of the Cable Isolator Products Division of Aeroflex Laboratories, respectively entitled "Aeroflex Helical Shock Mounts" and "Shock/Vibration Mounting Systems for Shipboard Electronic Equipment". Alternatively, the cable-type isolators as illustrated may be replaced by elastomeric-type shear mounts or other suitable means.

Secured to one or the other of side panels 26 to 28 is a humidity control, such as a dessicant received within a container 100. Thus, when equipment, such as illustrated by oscilloscope 104, is viewed within container 20, the humidity can be maintained at a specific level. Furthermore, a gage 104 may be provided in one of the side panels to indicate the humidity or pressure within the sealed container. A breather valve may be placed above door 34.

In operation, with doors 34 and 36 removed and either or both top shelf sections 78 and 82 pivoted upwardly, equipment can be loaded and securely strapped into position on bottom shelf 72 by use of straps 106 and clamps 108, as described for example in U.S. Pat. No. 3,478,995. The equipment is so distributed as to obtain an approximate even balancing of weight. Thereafter, section 78 and 82 are pivoted into contact with frame 73 and locked thereto by latch mechanism 84. The proper dessicant is then placed within container 100 and the doors are then sealed in place by use of latches 62. Upon proper pressurization and insertion of the desired atmosphere within container 62, the equipment is then ready for shipment.

Now referring to FIGS. 5-7 and the remaining drawings, a second embodiment is generally indicated by numeral 110. Container or module 110 comprises a pair of side panels 112, one of which is depicted in FIG. 5, front and back panels, of which a front panel 114 is depicted in FIG. 6, and top and bottom panels, of which a top panel 116 is shown in FIG. 7. Interconnections between the side panels where the top and side panels are sealed and secured together are depicted in FIG. 8 and comprises a corner bracket 118 to which, for example, the top and side panels are secured as by structural bonding, e.g., epoxy, welding or soldering, at mating parts 119. Connections between side and bottom panels are made in a similar manner.

Furthermore, all panels are enforced preferably by a stamping operation to provide, as illustrated in FIG. 9, an upset 120 of "criss-cross" configuration. For all panels except the bottom panel, the protuberances extend toward the exterior of panel 110 to provide maximum interior space. Bottom panel protuberances 120, however, extend toward the interior so as to provide an even face for bonding of the container to a forklift base 122.

As with the embodiment of FIGS. 1-4, the forklift base 122 is provided with a plurality of openings 124 for reception of the forks of the forklift.

However, unlike the first embodiment, container 110 is provided with 45° angle corners at its front and back doors. These doors are set within front door frame 126 and rear door frame 128. Contained within these frames are lift rings 130 and tie-rings 132 which, because of their recessed position, avoid hooking or otherwise damaging adjacent cargo or containers. Furthermore, manual carrying handles, for example, constructed in a manner similar to that of a bicycle stand, may also be placed within these recesses.

As better shown in FIG. 10, front door frame 126 has a flange 134 which is structurally bonded to top panel 118 by bonding, etc, as generally indicated at 135. On its other edge, front door frame 126 is provided with a flange 136 which is adapted for mating and latching engagement with the front door. Between flanges 134 and 136, the door frame is recessed inwardly to provide a 45° bridging web 138. This bridge or web is recessed towards the interior of modular container 110 for use not only for supporting rings 130 and 132 at its exterior face but also for supporting isolation elements, as will be hereinafter described.

As shown in FIGS. 10 and 11, the front and the rear panels are locked to their respective door frames 126 and 128 by a latching mechanism generally represented by numeral 140. Each door preferably utilizes six of these latches, as shown generally in FIG. 6. Latching mechanism 140 is included as part of molding fixture 142 which extends about the periphery of the door panel.

As best shown in FIGS. 10 and 11, flange 136 of frame 126 terminates in a generally U-shaped pocket 144 into which molding fixture 142 extends. One side of pocket 144 is formed by a flange leg 146 which presents an abutting end face 148 for contact with a mating end face 150 on fixture 142. Thus, a surface 152 of flange leg 146 smoothly extends to a surface 154 of molding fixture 142.

In addition, fixture 142 includes an outer flange 156, of which surface 154 is a part, an inner flange 158, and an intermediate flange 160. The three flanges are joined by a web 162. Door panel 114 is bonded at 163 to flange 158. Positioned between flanges 156 and 160 is a latch lever 164 (see also FIGS. 12a and 12b) which is pivotally held between the outside flange and the central flange by a rivet 166 or other suitable means. Lever 164 is beveled at one end 168 which acts as a cam against flange leg 146 and is provided with a face 169 for enabling the lever to be flush with face 150 (see FIG. 11) when the door is to be latched to its frame. Inner flange 158 includes a rim 170 which extends into a recess 172 in flange 136. An O-ring 174 is disposed within recess 172.

In operation, the door is moved towards frame 126 as shown by arrow 175 of FIG. 11. This action permits face 150 of fixture 142 to slide against face 148 of flange leg 146 until rim 170 presses against O-ring 174 in sealing engagement therewith. As soon as beveled surface 168 passes flange leg 146, lever 164 may be pivoted, thus permitting the camming action of surface 178 against flange leg 146. This camming action further presses rim 170 against the O-ring to increase the sealing fit of the door to frame 126 and to lock the two together. In order to maintain engagement of lever 14 with latching mechanism 140, a spring detent 176 residing within a recess 178 of flange 156 bears against the lever.

Now referring to FIGS. 5, 7 and 13, a carriage 180 is secured to modular container 110 at front and rear door frames 126 and 128 by vertical isolators 182 and horizontal isolators 184. Carriage 180 comprises a bottom frame 186 and an upper frame 188. Uprights 190 secure the upper and lower frames together. Extending outwardly from the uprights are brackets 192 which are angled in such a manner with bridging web 138 of frames 126 and 128 as to be parallel thereto.

In a manner, like brackets 192, brackets 194 extend downwardly from lower frame 186 and are angled to be parallel also with bridges 138 of the front and rear door frames. Horizontal isolators 182 are secured between brackets 194 and their matching bridges 138. The use of blocks like blocks 92 and 94 of FIGS. 1–4 are used to secure respective coil points to their frames or brackets as the case may be.

Secured to the lower frame is a layer comprising a plurality of lower shelves 196 having thereon resilient padding 198 for support of equipment to be transported. In a like manner, upper frame 188 has secured to it upper shelf layer 200 comprising shelf sections 202, 204 and 206. Central shelf section 204 is rigidly secured to the upper frame by nuts and bolts 207, for example, while shelf sections 202 and 206 are pivoted to section 204 by hinges 208 to permit lifting of the upper shelves nearest the front and rear doors to permit access to shelves 196 of the lower layer. A spring latch device 210 for each shelf section 202 and 206 engages these sections with uprights 190 to prevent movement of these sections in a manner similar to that described with respect to latches 84 and openings 85 of FIG. 2.

Although the invention has been described with reference to particular embodiments thereof, it should be realized that various changes and modifications may be made therein without departing from the spirit and scope of the invention.

What is claimed is:

1. A reusable equipment transporter and storage module comprising:
    a forklift base having opening means therein for receiving tines of a forklift truck;
    a pair of opposed reinforced side walls sealed and affixed to said forklift base;
    a pair of reinforced front and rear door frames sealed and affixed to said forklift base and to said side walls, said door frames having door receiving sills;
    a reinforced top sealed and affixed to said side walls and to said door frames;
    a pair of doors releasably secured to said door frames and having latching means engageable with said frames to secure said doors in said frames within said sills, and sealing means positioned between said doors and said door frames to provide an interior compartment bounded by said forklift base, said side walls, said door frames, said doors, and said top, said compartment being sealable from the environment exterior thereto;
    dessicant, breather, and pressurizing means provided in said compartment for providing a desired humidity and pressure environment within said compartment;
    a carriage resiliently suspended wholly by and within said compartment from shock and vibrations exerted thereon, said carriage comprising
        at least two layers of shelf means, a first of said layers positioned adjacent said forklift base and a second of said layers positioned above said first layer,
        uprights secured between said layers of shelf means for support thereof,
        said second layer of shelf means comprising at least two parallel frame members secured to said uprights, a center shelf secured to and between said frame members intermediate the ends thereof, and a pair of end shelves placed between said frame members and positionable to rest thereon and hinged to said center shelf for movement out of the plane of said frame members to afford access to said first layer of shelf means, and tie down means capable of being clamped to said shelves and about otherwise unpackaged equipment to be carried and secured to said shelves; and a plurality of shock mount means secured to and between said carriage and said compartment to provide the suspension and sole connection between said carriage and said compartment and thereby to isolate said carriage and equipment secured thereto from shocks and vibrations on said compartment and otherwise damaging to the equipment.

2. A reusable container as in claim 1 wherein said shock mount means comprises elastomeric shear mounts.

3. A reusable container as in claim 1 wherein each of said shock mount means comprises coils of stranded wire cable, each of said coils interconnecting adjacent points on said carriage and said compartment.

4. A reusable container for storing equipment otherwise unpackaged and unprotected from shock, vibration, humidity, degrading atmosphere, and other harmful environment comprising:

a closed compartment having means for sealing said compartment from the environment;

a carriage positioned in resilient suspension only by and within said compartment and having means securing the otherwise unpackaged and unprotected equipment to said carriage; and shock and vibration isolation means secured to and between said carriage and said compartment to provide the suspension for isolating said carriage and the secured equipment from three-dimensional shock and vibration exerted on said compartment and otherwise damaging the secured equipment.

5. A container as in claim 4 wherein said carriage comprises at least two shelving means having tie down apparatus securing the equipment to said shelving means.

6. A container as in claim 5 wherein said shelving means comprises at least two parallel layers of shelves, a first of said layers placed below a second of said layers.

7. A container as in claim 6 wherein said second layer comprises a shelf fixed with respect to said carriage and at least one other shelf pivotally secured to said fixed shelf for providing easy access to said first layer.

8. A container as in claim 5 wherein said carriage further comprises risers secured to and spacing said shelving means, at least some of said isolation means secured to said risers for connection to said compartment.

9. A container as in claim 6 wherein at least a first group of said isolation means is secured to said first layer of shelves.

10. A container as in claim 9 wherein sad carriage further comprises risers secured to and spacing said shelving means, at least a second group of said isolation means secured to said risers, said first group and said second group of said isolation means extending in orthogonal directions with respect to each other.

11. A container as in claim 10 wherein said isolation means each comprises coils of stranded wire cable, each of said coils having an axis extending in one of the orthogonal directions and interconnecting adjacent points on said respective risers and first layer and on said compartment.

12. A container as in claim 4 further including dessicant means secured to the interior of said compartment to control the humidity therein.

13. A container as in claim 4 further including valve means in said compartment for controlling the pressure and the atmosphere within said compartment.

14. A container as in claim 4 wherein said compartment comprises a base, a top, and wall enclosure means sealed and affixed together.

15. A container as in claim 14 wherein said base includes opening means therein for receipt of tines of a forklift truck.

16. A container as in claim 14 further including handle means secured to the exterior of said wall enclosure means for lifting of said compartment, said carriage and to equipment.

17. A container as in claim 14 further including tiedown means secured to the exterior of said wall enclosure means for tying down said compartment, said carriage, and said equipment.

18. A container as in claim 14 wherein said wall enclosure means is releasably secured to said base for providing access to said carriage.

19. A container as in claim 14 wherein said wall enclosure means includes at least one door frame having a sill and sealing means therein, and further including door means placeable within said frame in said sill and sealingly engageable with said sealing means.

20. A container as in claim 19 further including latching means cooperable with said door and said door frame for locking said door to said frame.

21. A container as in claim 14 further including mating protuberances and recesses on said top and said base for engagement between tops and bases of stacked compartments.

22. A container as in claim 14 wherein said wall enclosure means includes a pair of parallely positioned side walls and a pair of parallely positioned door frames secured to said side walls, and further including doors securable in said frames for providing access to opposed ends of said carriage.

23. A container as in claim 22 wherein said carriage comprises at least two parallel layers of shelves parallely positioned with respect to said base and having tie down apparatus securing the equipment to said layers and risers connecting said layers together, and wherein at least a first group of said isolation means at each end of said carriage is secured between one of said layers and a portion of one of said door frames and at least a second group of said isolation means at each end of said carriage is secured to at least some of said risers, said first group and said second group of said isolation means extending orthogonally with respect to each other.

24. A container as in claim 23 wherein each of said door frames includes a web angularly disposed with respect to said top, base and wall enclosure means to provide beveled edges to said compartment, said web being recessed towards the interior of said compartment, and further including tie down and lift up means in said recessed web for enabling transport of the container.

* * * * *